Figure 1:
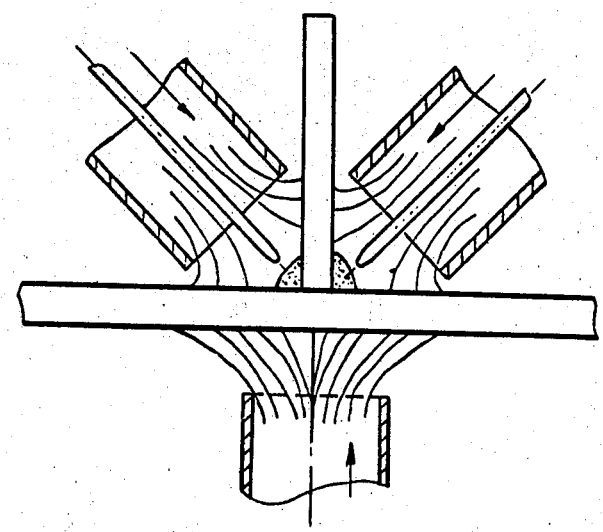

United States Patent

[11] 3,564,197

[72] Inventor  Christoph Bohlen
              Untere Hangstr.14, 5841 Lichtendorf,
              Germany
[21] Appl. No. 809,147
[22] Filed     Mar. 21, 1969
[45] Patented  Feb. 16, 1971
[32] Priority  Mar. 21, 1968
[33]           Germany
[31]           1,765,015

[54] WELDING OF REACTIVE METALS
     1 Claim, 3 Drawing Figs.
[52] U.S. Cl. .................................. 219/137,
                                               219/130
[51] Int. Cl. .................................. B23k 9/00
[50] Field of Search ........................... 219/137,
                                     130, 74, 75, 118, 161

[56]                 References Cited
                 UNITED STATES PATENTS
2,541,764  2/1951  Herres et al. ............... 219/118X
2,761,047  8/1956  Meredith ..................... 219/137X
2,798,843  7/1957  Slomin et al. ............... 219/118X
2,819,383  1/1958  Johnston ..................... 219/137X
2,922,870  1/1960  Collins et al. .............. 219/161
3,296,412  1/1967  Waite et al. ................ 219/73X Primary Examiner—R. F. Staubly
Assistant Examiner—C. L. Albritton
Attorney—Malcolm W. Fraser ABSTRACT: A method of forming welded seams between two plates or work pieces of titanium by which the weld is made at the juncture of the two plates by a shielded arc welding burner. The heat generated during the welding operation in the quasi stationary temperature weld is removed by means of fluid forcefully applied against an area of the titanium plates or work pieces on the side opposite to that where the welding is taking place so as not to reach the welding area and thereby to effect cooling to a temperature below the critical range.

PATENTED FEB 16 1971 3,564,197

INVENTOR
CHRISTOPH BOHLEN
ATTORNEY

WELDING OF REACTIVE METALS

The invention relates to a method for the welding of reactive metals, particularly titanium material, by means of a protective gas or shielded arc welding burner.

Reactive metals, as for example titanium, are very resistant against chemicals and are therefore installed predominately in chemical apparatus and machine construction. The converting to machine parts in cast or molded form is difficult. Therefore, also these parts such as chemical apparatus are produced from semifabricated forms as titanium plate, titanium tube, titanium contoured material and the like by means of welding. The working of semifabricated products has the advantage that hardly any or no machining work is necessary. As titanium material is expensive, the possibility is that the machining work is avoided.

It is known that by means of the highest melting points and the high welding energy required therefore, a great quantity of heat is supplied to the workpiece. As titanium possesses a very low heat conductability, there is formed at the welding point a great quasi-stationary temperature field with a high average temperature. It is known that titanium, as compared with the atmospheric gas component is very reactive at temperatures above approximately 300° C. and forms undesired combinations with the same. Furthermore, by means of high temperature in combination with the annealing time or cycle a coarse grain formation sets in which influences unfavorably the mechanical technological qualities and the resistance to corrosion of the titanium materials.

The local high temperatures lead beyond this to high thermal expansion during the welding and correspondingly great shrinkage and distortion upon cooling. It is sought to counteract this behavior caused by the material and the high welding energy supplied partially in this way that the quasi-stationary temperature field is protected with the critical temperature range before the admittance of the atmosphere.

The welding of titanium semifabricated product proceeds in the way that by means of the shielded arc welding burner the welded seam is made and the protective gas issuing from the burner covers the narrower welding zone with protective gas.

As the protective gas issuing from the shielded arc welding burner is not sufficient in order to protect the quasi-stationary temperature field with the critical area before the admittance of the atmosphere, this field is covered with additional mist or screen of protective gas. The mist or screen of protective gas is built up over so called shower members or sprays which must be adapted to the shape of the work piece in order to maintain at all critically heated points a pure protective gas atmosphere. As the parts to be welded frequently possess a low or small wall thickness, on the rear side of the welding seam likewise a temperature field with critical range is built up. In such a case here also a mist or screen of protective gas must be applied. With fillet welds or joints the mist or screen of protective gas is indeed to be applied on three sides. As ordinarily one or more showers or sprays are in use, the requirements for protective gas amounts to at least double the amount, however, often the multiple of the rate of charge of protective gas of the welded burner.

As is known, the welding takes place over a certain necessary length of welding seam. From this, it results that the shower or spray members must be here adjusted either uniformly which makes necessary a second or third auxiliary force or assistance, or the welding must take place timely intermittently as the shower or spray members must always be replaced anew again. In order not to have to prepare absolutely form sprays or showers for small complicated work pieces, it is known to weld these work pieces in a protective gas chamber which necessarily means an appreciable expenditure.

The conditions portrayed above render the technical welding treatment of titanium semifabricated items for one thing expensive on account of the excessive requirement for protective gas and on account of the attainable low hourly welding seam length, and for another thing, difficult on account of the definite covering of the quasi-stationary field with protective gas. In this way that the great quantity of heat is distributed over the workpiece and only the natural heat removal by means of radiation and conviction is present, in a great area a disadvantageous conversion of the material and a high distortion may occur. As the previous method of the welding of titanium by means of shielded arc welding burner and additional protective gas mist or screen was without anything further expensive, it seemed wrong to the technical world to add further protective gas as cooling means.

The problem lies as basis for the invention to cover the actual welding zone as previously with the protective gas of the welding burner, to decrease the temperature field in its expansion and to cool it to a temperature far below the critical range, whereby the protection from the atmosphere becomes superfluous in almost all cases.

The problem is solved according to the invention thereby that during the welding, heat is removed from the material in the quasi-stationary temperature field by means of liquid or gaseous cooling means.

The advantages attained according to the invention consist particularly in this, that in almost all cases, instead of a plurality of different protective gas showers for the most varied mold pieces or welding workpieces, only the simplest cooling means feeds are required. The cooling means, for example water, makes the installation of additional protective gas conduits superfluous and does not give rise to any substantial cost factors.

Embodiments of the invention are shown on the accompanying drawings in which

Figure 2:
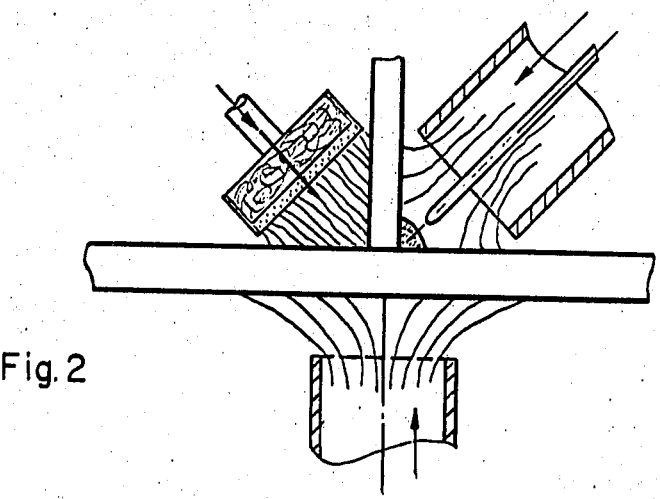
Figure 3:
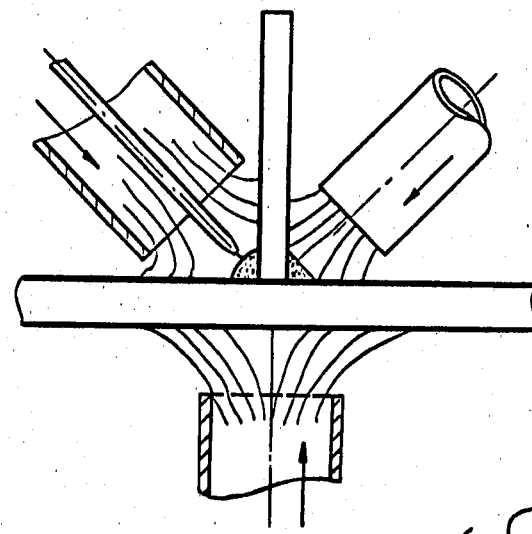

FIG. 1 is a schematic view showing the making of two welds simultaneously in two titanium plates arranged in T-relation and showing cooling means on the rear side of one plate;

FIG. 2 is a schematic view showing a weld made on one side, the opposite side being protected by a shower or spray and cooling similarly being effected on the rear side of one plate; and FIG. 3 is a schematic view showing the making of one weld with cooling means directed against the previous weld and also against the rear side of one plate. FIG. 1. Two fillet welds or joints are welded simultaneously with two shielded arc-welding burners. The workpiece is intensively cooled from the opposite side by means of a stream of water. The cooling means should not come in direct contact with the welding area.

FIG. 2. In case a fillet weld or joint is produced on one side, a relatively small form of shower or spray is necessary for protection of the oppositely disposed open edge. The cooling spray, the shielded arc-welding burner, and the pipe for water are all directed toward the same general area. The cooling takes place on the rear side of the workpiece as shown in FIG. 2. If the second fillet weld or joint is also to be made here, the welding may take place with cooling on two sides, as the water can no longer reach the welding area of the shielded arc welding burner as shown in FIG. 3.

Upon the welding of butt sides, first a thin root position is applied according to the old method with low additional protective gas requirement. All further positions are applied according to the method in accordance with the invention.

The supply of cooling means takes place by means of a tube which does not even need to have a preferred nozzle. The cooling effect of water is great, and it is sufficient to place the water pipe at a new position from time to time according to the welding speed, whereby the following up must not take place as exactly as with a protective gas spray or shower, as the heat removal by means of water is in each case strong enough.

I claim:

1. A method of welding together an edge of a first titanium sheet to one side of a second titanium sheet in the open atmosphere, which comprises:
   placing the edge of said first sheet in abutting relation to said one side of said second sheet;
   producing a weld seam at the junction of said sheets by a shielded arc welding burner; and simultaneously removing heat generated during welding in a quasi-stationary temperature field by applying a cooling fluid forcefully against an area of the second sheet on the other side thereof opposite the area being welded, with the material of the second sheet disposed between the area of impingement of the cooling fluid and the area of impingement of the welding arc.